Aug. 29, 1939.  F. C. DOBLE ET AL  2,170,813
APPARATUS FOR DETERMINING INSULATING VALUES
Filed June 20, 1936
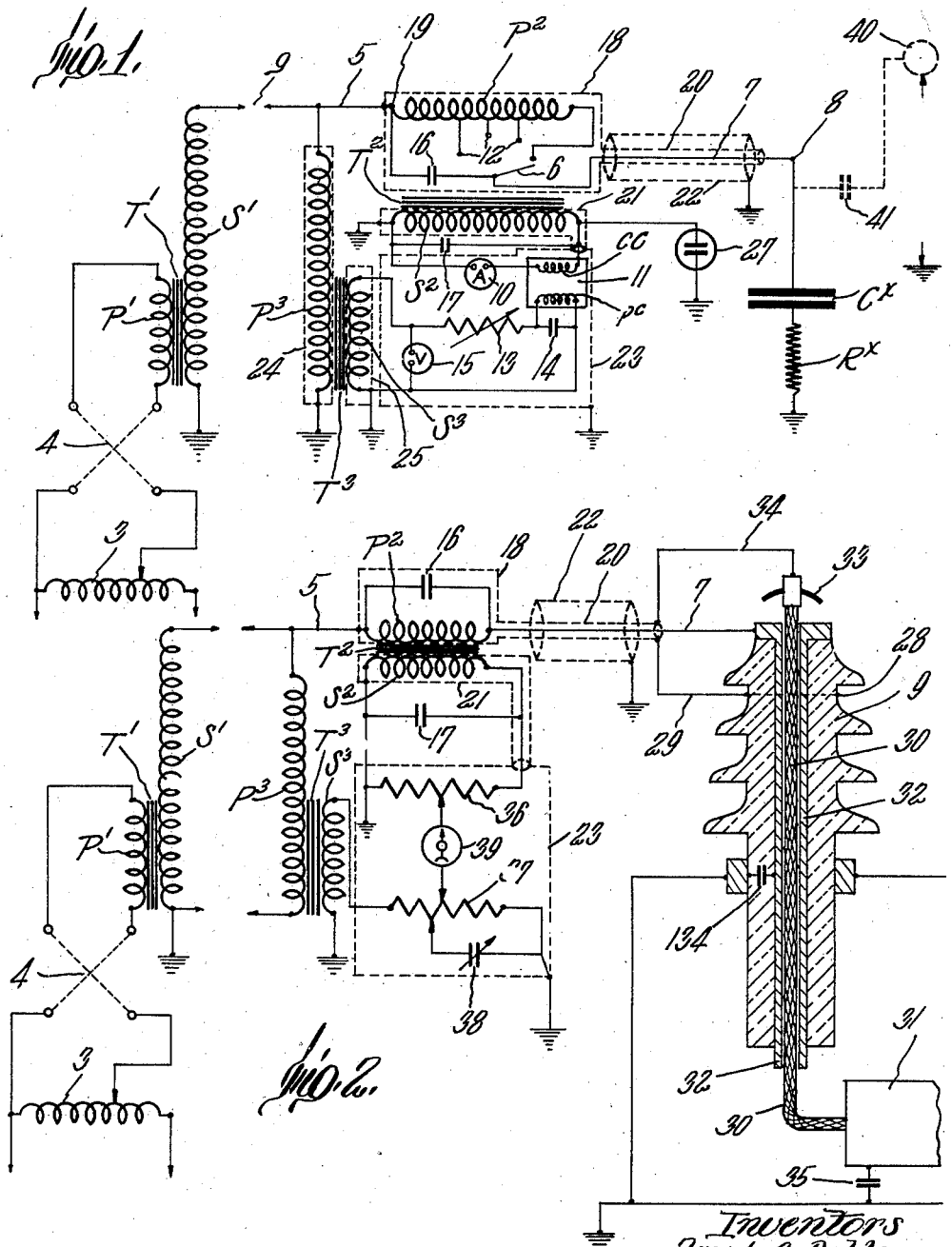

Patented Aug. 29, 1939

2,170,813

UNITED STATES PATENT OFFICE 2,170,813

APPARATUS FOR DETERMINING INSULATING VALUES

Frank C. Doble, Cambridge, and Glenn H. Browning, Winchester, Mass., assignors to Doble Engineering Company, Medford, Mass., a corporation of Massachusetts Application June 20, 1936, Serial No. 86,314

11 Claims. (Cl. 175—183)

This invention relates to apparatus for testing, and measuring quantitatively, the insulating values of dielectrics, particularly those which are fabricated into insulators of various forms for industrial use in confining the course of electric currents to prescribed conductive paths. Its object is to provide an apparatus capable of testing insulation in the field of use, where strong electrostatic or electromagnetic fields are or may be present, and where one terminal of the insulation, by the nature of its construction or mode of installation, is grounded.

The insulation contemplated in the foregoing statement includes such things as the bushings, operating rods, oil and other insulating elements of oil circuit breakers; the bushings and windings of power transformers and instrument transformers; and other apparatus used by power companies, public utilities, etc. which are so massive and bulky that they could not practicably be transported to a laboratory for testing under ideal conditions. Other insulation which can be tested is that of underground cables such as are commonly used for carrying high voltage currents in congested localities, the insulation of windings in generators which are used for generating electrical power at high voltages for commercial application, and other apparatus which cannot feasibly be removed from their installations. In all these and similar circumstances, the disturbances due to powerful electrical fields in the vicinity prevent the successful use of laboratory equipment which requires absence of extraneous disturbing factors. In its primary objects and ultimate results this invention is generically similar to that of the United States patent of Frank C. Doble, No. 1,945,263, granted January 30, 1934. It has the further objects of measuring the charging current and watts loss, from which the power factor of the test specimen is determined, from the input side; i. e., from the circuit through which voltage is impressed on the test specimen, rather than from the return side of the circuit through the grounded specimen; and of enabling the same apparatus to test not only such insulation as circuit breaker bushings of which the capacitance is relatively small, but also the insulation of equipment having many times greater capacitance, such as conductive cables, transformer windings, generator windings, etc. For instance, we have produced an apparatus which will cover a range of charging currents taken by the test specimen at 10,000 volts of between 20 microamperes and 3 amperes using the same wattmeter and current meter for all measurements.

The drawing furnished herewith illustrates diagrammatically two of the possible species of equipment in which the invention may be embodied. In Fig. 1 the equipment shown includes an ammeter, a voltmeter and a wattmeter as the instruments by which readings are taken for the determination of power factor; while Fig. 2 shows an alternative apparatus in which variable resistance, a variable capacitance, and a null detector are provided for the same purpose. These figures in conjunction further illustrate means included in the invention by which the apparatus is enabled to serve its purposes with test specimens differing greatly from one another in capacitance.

Describing first the apparatus shown in Fig. 1, 3 represents a device such as a potentiometer which may be either a resistance, or a variable inductance as shown, for regulating the amount of voltage delivered from a power source of alternating current. The current flows to the primary winding P' of a step up transformer T' through a reversing switch 4, which can be set to reverse the phase of the voltage; i. e., vary the phase by 180°. The current induced in the secondary S' of this transformer is applied to the specimen to be tested. We find it convenient in practice to apply such current at a potential of approximately 10,000 volts, wherefore the transformer and potentiometer are designed accordingly, but any other desired voltage may be used, and a considerable variation may be effected by the potentiometer. The high tension terminal of the transformer secondary is connected with a conductor 5, in series with the primary winding $P^2$ of a second transformer $T^2$, and with a switch 6 and a conductor 7 which leads, when in use, to one terminal 8 of the insulation to be tested, the other terminal of which is grounded. In this diagram the test specimen is indicated diagrammatically as a capacitance $Cx$ and a resistance $Rx$ in series. Every insulator or dielectric used in connection with alternating current has characteristics of one or more resistances or one or more condensers, or of both a resistance and a condenser in parallel or series circuit. The showing in Fig. 1 is designed to represent generically any such insulator or insulating body or mass of insulation. A specific insulator 9, which is the bushing for one of the leading-in conductors of a power transformer, is shown in Fig. 2 as a concrete example of the insulation which may be tested.

The secondary winding $S^2$ of the transformer $T^2$ is connected through a current meter 10 and the current coil $cc$ of a wattmeter 11. It is also connected to ground. The purpose of this transformer is to enable a correct indication of the charging current passing to the test specimen to be given by suitable measuring instruments or means which are at substantially ground potential while the current measured is at high potential. The current in the secondary winding $S^2$ may be varied and adjusted by means of the switch 6 and taps 12, connected at different points with the primary winding $P^2$, to accord with the capacitance of the test specimen. Thus if the specimen has a large capacitance, the switch is set to reduce the number of turns of the primary winding through which current flows; and vice versa in the case of a specimen of small capacitance. By making the primary winding with a sufficient number of turns, and providing a sufficient number of taps connected to appropriate points of the winding, the current induced in the secondary winding may be kept within a range which can be indicated accurately by the same current meter and wattmeter when testing specimens of most widely varying capacitance values.

A third transformer $T^3$ is provided, of which the primary winding $P^3$ is connected between the high tension conductor 5 and ground, and the secondary winding $S^3$ is connected to the potential coil $pc$ of the wattmeter 11 through a variable resistance 13. A capacitance 14 is connected across the potential coil. This resistance and capacitance, acting in conjunction, allow the phase of the current passing through the potential coil of the wattmeter to be adjusted to the proper relation with the current passing through the current coil $cc$, so that the wattmeter will indicate the watts loss in the test specimen. Preferably a voltmeter 15 is connected directly across the terminals of the winding $S^3$ to show the amount of the voltage applied to the test specimen.

A capacitance 16 may be connected across the primary $P^2$ and a capacitance 17 across the secondary $S^2$ of the transformer $T^2$ for the purpose respectively of changing the phase of the current through the primary winding in relation to the voltage across the secondary winding, and of affecting the phase of the current passing through the current coil of the wattmeter, so that the wattmeter will give substantially correct indications over a wider range of current through the primary winding than would otherwise be the case. These capacitances are correcting or refining elements, but are not essential features of the invention, for the transformer may be so designed as to obtain the same effects without their use.

The apparatus thus described, or at least so much of its as comprises the instruments and the transformers $T^2$ and $T^3$ is portable and designed to be brought to the place in which the insulation to be tested is installed, and there connected with a source of power and with the test specimen. For convenience of transportation different parts of the apparatus may be mounted in separate cases, as the measuring instruments in one case and the transformers in other cases; and when set up for use the proper connections are made by intermediate conductors. The transformer $T'$ may also be made of portable dimensions and weight, but is not necessarily so, and the break shown at $g$ in the drawing in the connection between this transformer and the rest of the apparatus is left to indicate that it may equally well be a fixture in a power station or elsewhere. The conductor 5 may be of any length necessary to connect the portable apparatus with such a fixed part of the equipment. For instance when testing the insulation of generator windings, high tension cables, etc. in power generating stations, the transformer $T'$ may be, or may be taken to represent, a voltage source of any character capable of supplying power at required voltage and current value. Measurements may be made at voltages ranging anywhere from 400 to 50,000 volts according to the apparatus tested, and the conditions under which it is necessary or desirable to make the measurements. Such transformer and the associated potentiometer 3 typify any source of alternating voltage capable of serving these ends.

In using this apparatus for its intended purpose, the lead conductor 7 is connected to one (the high voltage) terminal of the insulation under test and alternating current at the selected voltage is delivered from the transformer or voltage source $T'$. The current passing through the transformer primary $P^2$ in its course to the test specimen produces a current through the secondary circuit $S^2$, which latter energizes the current coil of the wattmeter 11 and also shows, by means of the current meter 10, the amount of current taken by the test specimen. At the same time the potential coil of the wattmeter is energized by voltage from the transformer secondary $S^3$. Thus any loss of power through the insulation is shown by the wattmeter. Thus five quantities are shown from which the power factor of the test specimen may be calculated by the known formula. The variable resistance 13 is an adjusting means by which the wattmeter may be calibrated with respect to a standard of which the resistance is known; and further adjusted if necessary to cancel out losses due to the resistance of the transformer winding and the resistance of the wattmeter current coil. Or if these losses are not thus compensated for, they may be subtracted from the wattmeter reading, being of known values, in order to obtain the true value for the watts loss through the test specimen.

A system of shielding is provided to keep capacitance currents and electrostatic induction from affecting the readings of the instruments. A shield 18 surrounds the primary winding $P^2$ of the transformer $T^2$, and is connected both to the high potential terminal 19 of said winding and to a shield 20 which surrounds the conductor 7 leading to the specimen under test. A shield 21 surrounds the secondary winding $S^2$ of this transformer and is connected to one terminal of the winding and to ground. An outer shield 22 surrounds the inner shield 20 of the conductor 7 and is connected to ground. The instruments 10, 11, 15 and their connections are enclosed in a case 23 which is in itself, or includes, a shield which is grounded when the apparatus is put to use in high electrostatic fields. The entire transformer $T^2$ may also be enclosed in a case or shield, which may be grounded when tests are made. Preferably also the primary and secondary windings of the transformer $T^3$ are surrounded by shields 24 and 25, which also are grounded.

Structurally such shields may be of any character known in the art or which may hereafter be devised, which is suitable for the purpose. They are of conductive material and are insulated from the conductors which they respectively surround and envelop. Their purposes and functions are the following. The connected shields 18 and 20 prevent capacitance currents of all conductors within these shields from going to ground and thus setting up a current through the primary winding P² which would affect the instruments 10 and 11 in circuit with the secondary winding S². If the shield 20 were omitted the capacitance currents from conductor 7 to ground would flow through the primary P² and would be indicated on the instruments, in addition to the indications caused by the current to the insulation under test, which latter alone is desired to be measured. These shields constitute what may be called a guard circuit, for charging currents between them and ground do not pass through the primary P² and consequently do not affect the indications of the measuring instruments. The utility of this guard circuit in testing certain types of insulation is later described. The grounded shield 21 surrounding the secondary winding of transformer T² is employed so that no capacitance currents from the shield 18 will pass through the secondary winding S² and affect the instruments. The grounded outer shield 22 enclosing the shield 20 is a safety means which, if it does not wholly cancel, at least reduces to a very large extent, the effects of electrostatic induction on the measuring instrument when the apparatus is brought to use in conditions where electrostatic stress is present. Its function and effect are essentially like those of the shield 23 in which the measuring instruments are enclosed. The shields 24 and 25 of the transformer T³ are used to obtain additional accuracy and ease of operation of the apparatus. Their function is to maintain the phase change in this transformer as nearly constant as possible under field conditions.

While it would be possible to use the testing apparatus in a manner such as to eliminate the necessity of such shields, to do so would necessitate taking a double set of readings. That is, it would be necessary to take a reading with the conductor 7 disconnected from the insulation, but placed in close proximity to it, and take a second reading with the conductor in connection with the insulation; the same voltage being applied both times. The charging current and watts loss in the specimen would then be determined by computations made from the two sets of readings. The shields are thus an important and valuable factor by virtue of the simplification in the use of the apparatus which they afford.

A neon tube 27 is connected to the secondary of transformer T² and to ground in order to protect the current meter and wattmeter from damage in case voltages larger than those for which the instruments are designed are developed in said secondary winding. The gas in the neon tube becomes a conductor with increase of voltage to a point below the safe limit for which the current meter and the current coil of the wattmeter are designed, and in effect then provides a short circuit path around the instruments for currents at greater than the prescribed limit of voltage.

The guard circuit previously defined provides a means by which leakage over the surface of the insulation being tested may be prevented from affecting the measuring instruments, and by which also protection may be given to the insulation of conductors passing through the insulation under test, such as the lead to a power transformer winding through an insulating bushing. These specific functions are illustrated in connection with the bushing 9 shown in Fig. 2. It is to be understood that such bushing is one species of the insulation generically represented by $Cx$ and $Rx$ in Fig. 1, and that it may be connected with the conductor 7 and shield 20 of Fig. 1 in identically the manner shown in Fig. 2, or in an equivalent way.

The potential of the guard circuit (shields 18 and 20) is of nearly the same value above ground potential as that of the conductor 7, differing in potential from the latter only by the voltage drop across the primary P², which in practice may be in the order of magnitude of four or five volts. The precise voltage drop here in unimportant; what is important is the fact that the potential difference is very small in comparison with that between the conductor and ground. A conducting band 28 of any suitable character may be applied to the outer surface of the insulator and connected by a conductor 29 with the guard terminal, i. e., the end of the shield 20. Consequently if leakage from the high potential conductor occurs over the surface of the insulator, it does not affect or alter the readings of the instruments due to the current taken by the insulator. This manner of protection may be used with insulation of any type or character.

Protection of the insulation of conductors passing through bushings of the type here shown, is afforded by the guard circuit in the following way. Such a conductor is illustrated in Fig. 2 as an insulated lead conductor 30 which passes to the transformer winding 31. The bushing, of high dielectric strength, is lined by a metal tube 32 through which the lead conductor passes, and from which the latter is insulated only by ordinary cable insulation. When the test is made, the lead conductor is disconnected from the external circuit, and the cap 33 of the bushing may be displaced from contact with the lining tube 32. The conductor 7 by which the test voltage is applied is connected to some part of the conductive material constituting the lining tube. The guard circuit is connected to the conductor cable 30 by a conductor 34. Thus the bushing is electrically isolated from the transformer winding 31 and its lead 30, and, when the voltage is applied for test, the lead to the transformer winding is at substantially the same potential as the tube 32 within the bushing. In other words, there is no such voltage stress as would be liable to break down the insulation between the cap 33 and tube 32 or the insulation between the lead conductor 30 and this tube. The measuring instruments show then only the watts loss and charging current of the bushing itself, the capacitance of which is diagrammatically represented by the symbol for a condenser at 134. The charging current due to the capacitance of the winding 31 to ground (represented by the symbol 35) does not actuate the meters. As shown by the drawing, the means for eliminating measurement of any current leakage over the surface of the bushing may be used in connection with the protection for the insulation of the internal conductor. It is to be understood that the specific illustration here described is typical of all assemblages where conductive material exists between an insulated conductor and the insulation being tested.

An alternative form of instruments or means for measuring charging current and watts loss through insulation being tested is shown in Fig. 2. All of the apparatus here shown, except the measuring instruments, is or may be the same as shown in Fig. 1, and the corresponding parts are designated by the same reference characters. The measuring instruments here comprise a resistance 36 connected across the secondary S² of transformer T²; a resistance 37 and a variable capacitance 38 connected in parallel across the secondary of transformer T³; and a sensitive null detector 39 connected between the resistances 36 and 37. These latter connections may be adjusted to different points of the resistances 36 and 37; and the connection of the capacitance 38 with the resistance 37 may also be varied. The adjustments of the several connections and of the variable capacitance are made in the course of a test until the voltage indicated by the sensitive null detector appears as zero. The magnitude of the test voltage applied to the specimen is known from the conditions of the test. The voltages through the resistances 36 and 37 have constant known relationships with the test voltage both in phase and in magnitude; and the values of the several fractions of these resistances which are tapped by the adjustable connections are also known and are shown by indices which may be read when a null balance is attained at the indicator 39. From these known values the amount of loss through the test specimen and its charging current or capacitance may be calculated.

It is to be understood that the switch 6 and taps 12 shown in Fig. 1 in connection with the primary of transformer T² may equally well be combined and used with measuring means of the type shown in Fig. 2. In either case the purpose of such tapping is to vary the number of turns of the transformer primary P² in accordance with the capacitance of any insulation to be tested. This is of very great advantage in field work, as it enables the apparatus to cover a wide range of capacitance and loss in the specimen under test; whereby the same apparatus may be taken into electrical switching yards for testing bushings of transformers, circuit breakers, etc. at a definite voltage, or into generating stations for similarly testing the watts loss and charging current of generator windings, high tension cables, etc. In other words; insulation may be tested under practically all conditions.

We have referred at numerous points in the foregoing specification to the use of this apparatus for testing insulation in the field. By "field" in this connection we mean the location or situation in which the insulation is installed and used. In many of such situations conductors carrying large currents or charged to a potential many thousand of volts above ground potential, are nearby. Such a high tension conductor is shown at 40 in Fig. 1. It produces a strong electrostatic field, with capacity effect, indicated by the symbol 41, to the test specimen and creating electrostatic induction in the latter. Electromagnetic induction also is sometimes encountered where a conductor carrying a large current runs parallel and close to the conductor 7 leading to the specimen, and it sets up a voltage in the lead conductor or in the test specimen itself. The reversing switch 4 is used in such circumstances to cancel the error given by the measuring instruments due to such effects. By taking two sets of readings, with the phase of the voltage source varied 180° by the reversing switch between readings, and averaging such readings, the true watts loss and current value are correctly determined.

It may be noted with reference to the transformer T², that while the primary of this transformer is at high potential, i. e., 10,000 volts or whatever other voltage may be selected for testing, nevertheless the secondary winding of this transformer is at a much lower voltage, one of its terminals being grounded. This is a desirable safety precaution for the protection of the current meter 10 and wattmeter 11 in this secondary circuit, although it is not an essential of the invention.

What we claim and desire to secure by Letters Patent is:

1. An apparatus for measuring in the field electrical qualities of insulation interposed between ground and a high tension terminal, comprising the combination with a source of alternating voltage having a connection for completion of the circuit with the insulation, of a conductor adapted to lead from said voltage source to the high tension terminal of the insulation, a transformer having its primary winding in series connection with said conductor, a shield in electrical connection with the high tension terminal of said winding, enveloping the winding and conductor, means for measuring quantities determinative of energy loss and current or capacitance of said insulation, and connections for applying to said measuring means voltage at a substantially constant phase and magnitude from said voltage source, and current from the secondary winding of said transformer.

2. An apparatus as set forth in claim 1 comprising further grounded shileds enveloping respectively the secondary winding of said transformer, said measuring means, and the shield of the first named conductor between said primary winding and the outer terminal of the conductor.

3. An apparatus for testing the quality of insulation of which one terminal is grounded, consisting of a transformer adapted to be connected with a source of alternating voltage, a shield enclosing the primary winding of said transformer and connected to the high tension terminal of said winding, conducting means adapted to be connected for leading voltage of prescribed magnitude from said winding to the insulation to be tested, a shield enveloping said conducting means and connected to the first named shield, a grounded shield enveloping the secondary winding of said transformer, measuring means in connection with said secondary winding, and means adapted to apply voltage to said measuring means at a substantially constant ratio in both phase and magnitude with the voltage source.

4. A testing apparatus as set forth in claim 3 and comprising a second shield enveloping said conducting means and the shield thereof and being connected to ground.

5. An apparatus for testing the quality of insulation of which one terminal is grounded, comprising the combination with an alternating voltage source having a connection from its low-voltage terminal to ground, of a conductor adapted to conduct voltage of a prescribed magnitude from the high voltage terminal of said source to the high tension side of such insulation, a transformer of which the primary winding is connected in series with said conductor and the secondary winding is adapted to affect the after mentioned measuring means, a guard circuit consisting of a shield enveloping said conductor and primary winding, in connection with the high tension terminal of the latter, a conductive band enveloping the insulation under test and connected with said shield for preventing leakage currents over the insulation from affecting the measuring means, and measuring means in connection for actuation by the secondary current of said transformer and by voltage having a constant phase and magnitude ratio to the test voltage for showing energy loss and current or capacitance in the insulation.

6. A measuring apparatus for the purposes hereinbefore set forth, comprising the combination with a source of alternating voltage having a conductor to ground from its low-voltage terminal, of a transformer, the primary winding of which is in connection at its high tension terminal with such voltage source, a conductor adapted to extend from the low tension terminal of said primary winding to the insulation under test, measuring instruments for showing energy loss and charging current or capacitance of the test specimen connected to be influenced by the secondary current of said transformer and by voltage at a given ratio to the voltage of said source, and means for shifting the effective point of connection between said primary winding and lead conductor, whereby to enable the same measuring means to serve with test specimens differing widely in capacitance from one another.

7. An apparatus for testing the insulating value of transformer bushings and for similar uses comprising in combination a source of alternating voltage, a transformer having primary and secondary windings, a lead conductor, said primary winding and lead conductor being connected between the voltage source and the bushing under test, connections for completing the circuit between the bushing and voltage source, measuring instruments, connections for applying current from said secondary winding and voltage source having a substantially constant phase and magnitude ratio with respect to the voltage source, to said instruments, a guard circuit enveloping said transformer primary and lead, and a connection between said guard circuit and a conductor forming part of the apparatus with which the bushing under test is used and which passes through such bushing.

8. An apparatus for testing the quality of insulation when one terminal of such insulation is grounded, comprising the combination of a source of alternating voltage having a connection to ground, a conductor adapted to be connected with the high voltage terminal of the insulation under test, a transformer having its primary winding in series connection between said conductor and the high tension terminal of said voltage source, measuring means in connection with the secondary winding of said transformer and with ground for indicating quantities determinative of the quality of said insulation, means for applying voltage to said measuring means with a known phase relation to the voltage source, and shielding means adapted to substantially prevent charging and leakage currents originating in said apparatus from affecting the measuring means.

9. An apparatus for measuring in the field electrical qualities of insulation between ground and a high tension terminal, comprising the combination with a source of alternating voltage having a connection to ground, of a conductor adapted to conduct voltage from the high voltage terminal of said source to the high tension terminal of the insulation, a transformer having its primary winding in series connection with said conductor, a shield in electrical connection with said winding enveloping the winding and conductor, means for measuring quantities determinative of energy loss and current in said insulation, and connections for applying to said measuring means voltage at a substantially constant phase and magnitude from said voltage source and current from the secondary winding of said transformer, and means for varying the phase of the voltage from said voltage source by 180 electrical degrees.

10. An apparatus for testing the quality of insulation when one terminal of said insulation is grounded, comprising the combination with an alternating voltage source having a connection from its low voltage terminal to ground, of a conductor adapted to conduct voltage of a prescribed magnitude from the high voltage terminal of said source to the high voltage side of such insulation, a transformer of which the primary winding is connected in series with said conductor and the secondary winding is adapted to affect the after mentioned measuring means, a guard circuit comprising a shield enveloping said conductor and primary winding, and measuring means for indicating the quality of said insulation connected for actuation by the secondary current of said transformer and by voltage having a substantially constant phase and magnitude ratio to the test voltage.

11. An apparatus for testing the insulating value of transformer bushings and for similar uses comprising in combination a source of alternating voltage, a transformer having primary and secondary windings, a lead conductor, said primary winding and lead conductor being connected between the voltage source and the bushing under test, connections for completing the circuit between the bushing and voltage source, measuring instruments, connections for applying current from said secondary winding and voltage source having a substantially constant phase and magnitude ratio with respect to the voltage source, to said instruments, and a guard circuit enveloping said primary winding connected to the voltage source at a point of connection between said source and the primary winding.

FRANK C. DOBLE.
GLENN H. BROWNING.